Nov. 17, 1925.  1,561,808
J. R. TOWNE
PROCESS OF PRODUCING FISHLINE FLOATS AND THE LIKE
Filed March 1, 1923
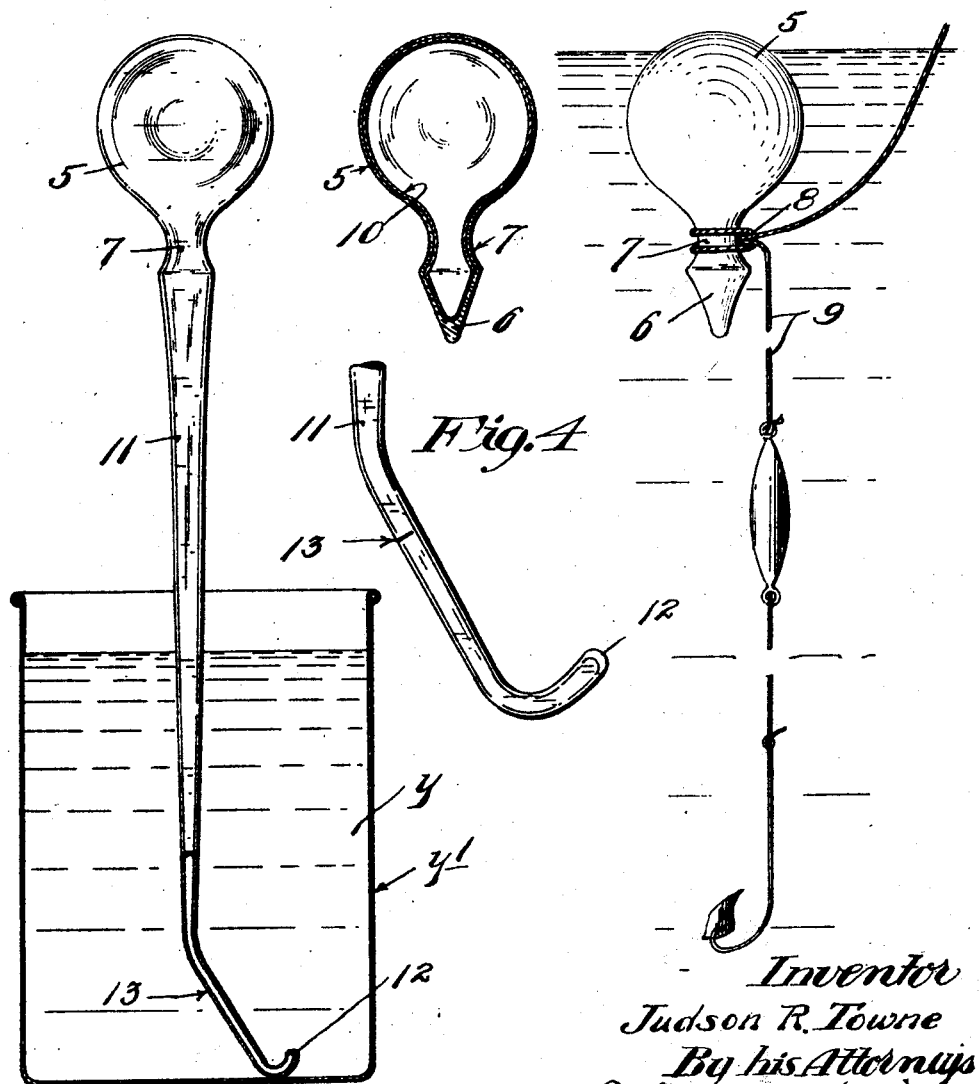
Inventor
Judson R. Towne
By his Attorneys Patented Nov. 17, 1925.

1,561,808

UNITED STATES PATENT OFFICE.

JUDSON R. TOWNE, OF MINNEAPOLIS, MINNESOTA.

PROCESS OF PRODUCING FISHLINE FLOATS AND THE LIKE.

Application filed March 1, 1923. Serial No. 622,069.

*To all whom it may concern:*

Be it known that I, JUDSON R. TOWNE, a citizen of the United States, residing at Minneapolis, in the county of Hennepin and State of Minnesota, have invented certain new and useful Improvements in Processes of Producing Fishline Floats and the like; and I do hereby declare the following to be a full, clear, and exact description of the invention, such as will enable others skilled in the art to which it appertains to make and use the same.

Generically, my invention relates to the art of filling or coating the interiors of glass tubes or hollow spheres, and it provides several different improved articles of manufacture, such, for example, as an improved fish line float, and a container for various different kinds of fluids. The invention will first be described in its application to the manufacture of fish line floats.

In carrying out my invention, a small glass tube is first heated and drawn out to form an attentuated stem, and then the stem, at its large end, is closed, heated, and a bulb or hollow sphere is then blown.

Immediately after the bulb is blown and while it is at its high temperature, the small end of the stem is fused, and thereby the bulb and stem are hermetically sealed. Then the closed end of the stem is submerged in the coating liquid, for example a silvering solution, and the stem is then broken off below the surface of said liquid. At this time, the bulb having cooled, there will be a partial vacuum formed in the bulb so that when the submerged stem is broken off, the liquid or solution will be drawn up into the bulb usually nearly filling the same and producing the desired mirror-like coating on the interior of the bulb. Thereafter, the surplus solution may be drawn out of the bulb by means of a vacuum or centrifugal force.

To facilitate breaking off of the stem at the correct point below the surface of the liquid, the tapered or small end is laterally bent out of the line of the axis of the stem and preferably is scratched below the bend so that the stem may be broken certainly and definitely at the scratched point simply by a downward pressure on the bulb.

The stem is then cut short and closed by fusion leaving an air-tight bulb, and will serve as a highly efficient fish line float. The invention will be more fully described in connection with the accompanying drawing, wherein like characters indicate like parts throughout the several views.

Referring to the drawings:

Fig. 1 shows a completed float applied to a fish line.

Fig. 2 is a vertical axial section of the float;

Fig. 3 shows the form of the bulb before its closed stem has been broken off, and shows the same submerged in a tank containing a silvering solution or other liquid; and Fig. 4 is an enlarged side elevation showing the stem part only of the bulb.

Directing attention first to Figs. 1 and 2, it will be noted that the hollow glass bulb or sphere 5 has a depending closed conical point 6 connected to the body of the bulb by a contracted neck 7, to which latter a looped portion 8 of a fish line 9 is adapted to be connected in the usual or any suitable way. By reference to Fig. 2 is will be noted that the neck and head, as well as body of the bulb, are hollow and that they are provided with an internal coating 10 preferably of silver. This is a description of the completed float.

Fig. 3 shows the bulb after the original tube has been heated and blown into the bulb form at one end, and after the neck portion 7 has been formed but before the head 6 has been formed and closed; and at which time, the tube from the neck 7 down is formed with a hollow stem 11 that decreases in diameter to a very small dimension and is closed at 12. To adapt the stem 11 to be readily broken off while submerged as above stated, it is provided with a "scratch" or small notch 13, which, however, does not cut into the interior of the stem; and at a point preferably slightly above this "scratch" the stem is bent laterally out of the line of the axis of the stem, and advisably the extreme lower end of the stem is upwardly curved. With the stem constructed as described, and when the stem is inserted into the liquid $y$ contained in a container $y^1$ and a downward pressure is exerted on the bulb, the stem will be broken off at the "scratch" 13 below the surface of the liquid. Instantly the liquid will be drawn upward into the bulb nearly filling the same. If the bulb is to be used as a float, the surplus coating material will be drawn off as before stated by vacuum or centrifugal force and then the stem would be sealed off by fusion just below the expansion or neck portion 7. When the device is to be used as a container for a liquid, the bulb will, of course, be sealed while nearly or quite filled with the liquid.

This bulb produced in accordance with my invention is an ideal container for any and all liquids that must or should be hermetically sealed. For example, it will make an ideal holder for liquids containing bacteria.

As a fish line float, the bulb is very buoyant, and when lined with silver will have a high degree of visibility, and extreme sensibility. Moreover, the line will not freeze to this glass bulb and hence the bulb may be readily adjusted on the line even in the coldest weather.

From a broad point of view, my invention may be utilized to fill hollow containers of various different forms, such, for example, as a glass tube, and these glass containers filled and sealed as described are ideal for use in containing vaccines, antitoxines, or substances of similar nature.

What I claim is:

1. The process of forming glass bulbs and of injecting fluid thereinto which consists in forming a bulb on the end of a tubular glass stem, in closing the end of the stem while the bulb is hot, in scratching the stem to afford an easy point of breakage thereof, in immersing the end of said stem in a liquid to a point below said scratch, in breaking off said stem at said scratch while it is thus immersed, whereby the liquid will be drawn into said bulb by partial vacuum, and in thereafter closing said stem by fusion.

2. The process of forming glass bulbs and of injecting fluid thereinto which consists in forming a bulb on the end of a tubular glass stem, in closing the end of the stem while the bulb is hot, in immersing the closed end of the stem in liquid and breaking the same below the surface of the liquid, whereby the liquid will be drawn into the bulb by partial vacuum, and in thereafter shortening said stem and closing the same by fusion thereof.

3. The process of forming glass bulbs and of injecting fluid thereinto which consists in forming a bulb on the end of a tubular glass stem, in closing the end of the stem while the bulb is hot, in immersing the closed end of the stem in liquid and breaking the same below the surface of the liquid, whereby the liquid will be drawn into the bulb by partial vacuum, and which consists further in shortening said stem and in forming thereof a contracted neck and a closed head.

4. The process of forming glass bulbs and injecting fluid thereinto which consists in forming a bulb on the end of a tubular glass stem, in closing the end of the stem while the bulb is hot, in bending the end of said stem laterally to insure breaking thereof below the liquid level under downward pressure on the bulb.

5. The process of forming glass bulbs and injecting fluid thereinto which consists in forming a bulb on the end of a tubular glass stem, in closing the end of the stem while the bulb is hot, in bending the end of said stem laterally at an oblique angle to the axis of the stem, and in scratching said stem below the bend to definitely fix the point of breakage under downward pressure on the bulb.

In testimony whereof I affix my signature.

JUDSON R. TOWNE.